May 11, 1948. G. WALTERS 2,441,460
BELT SPLICE
Filed Feb. 9, 1945 2 Sheets-Sheet 1
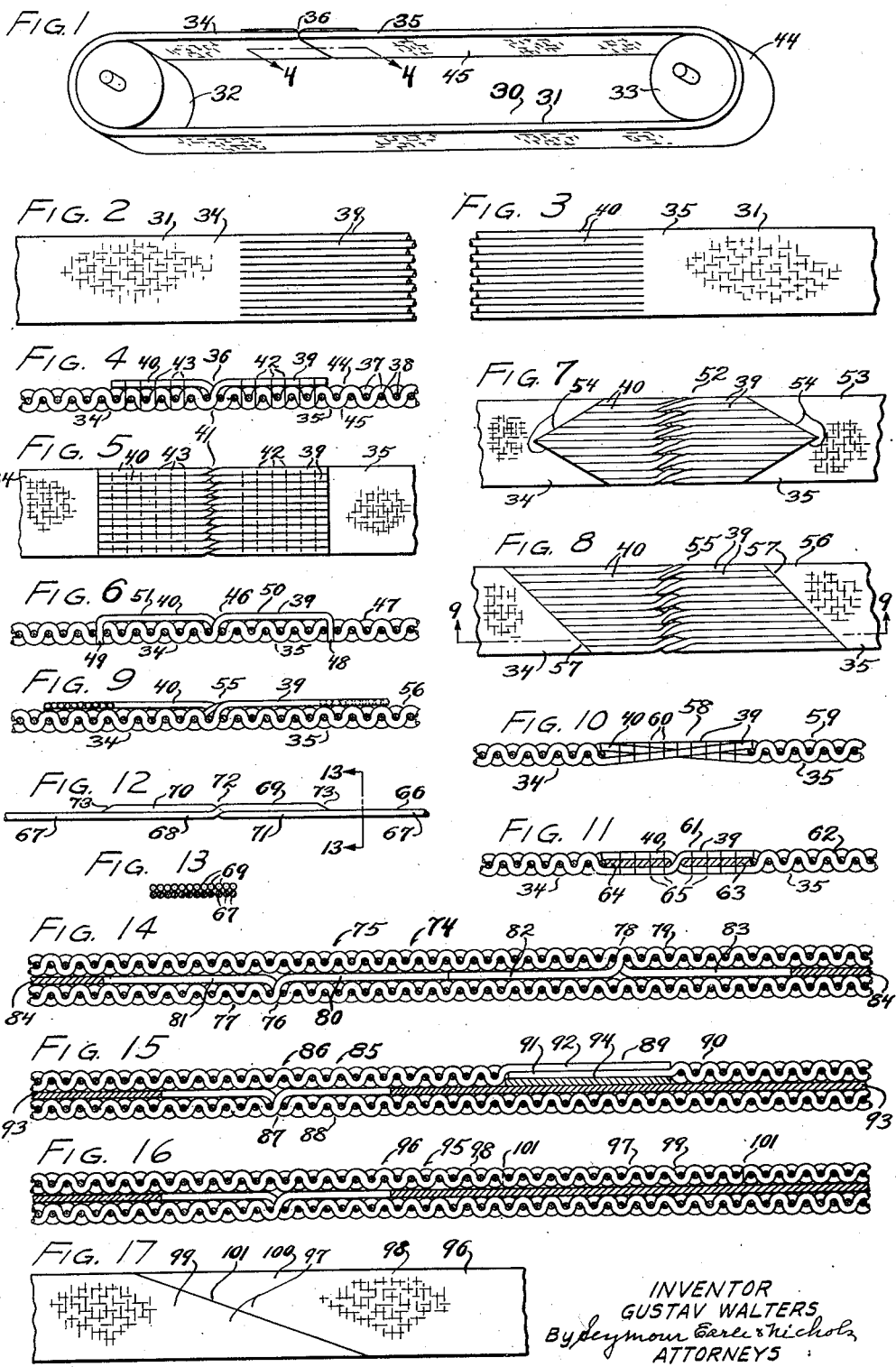
INVENTOR
GUSTAV WALTERS
By Seymour Earle & Nichols
ATTORNEYS May 11, 1948.  G. WALTERS  2,441,460
BELT SPLICE
Filed Feb. 9, 1945  2 Sheets-Sheet 2
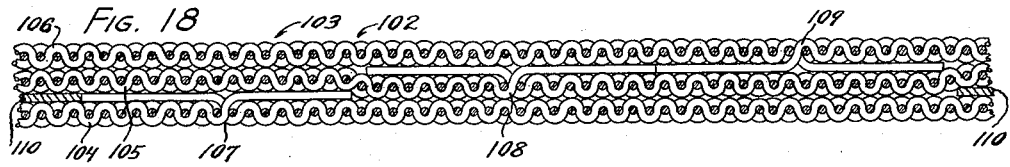
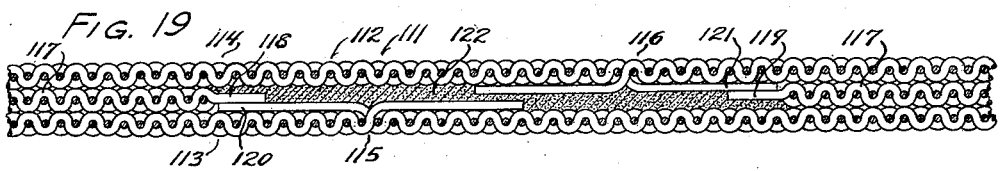
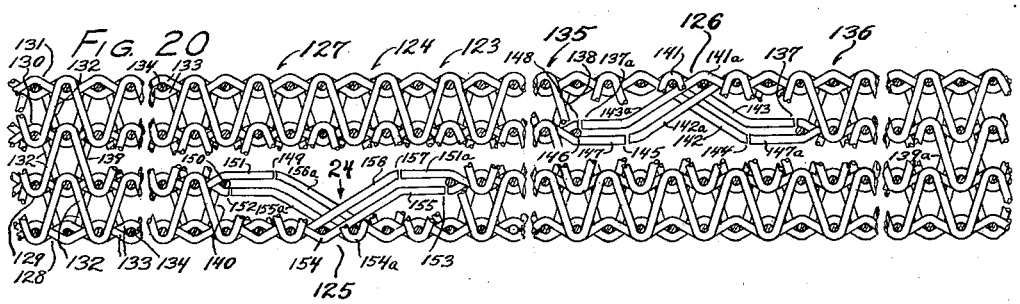
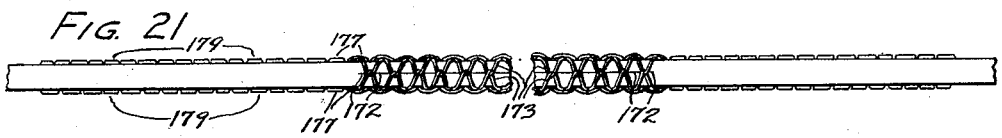
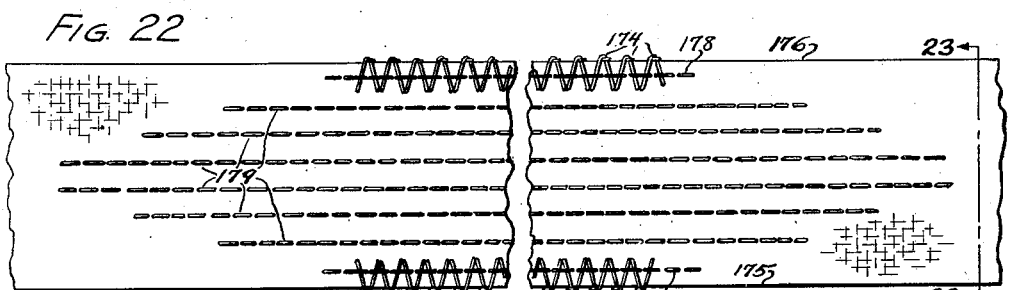
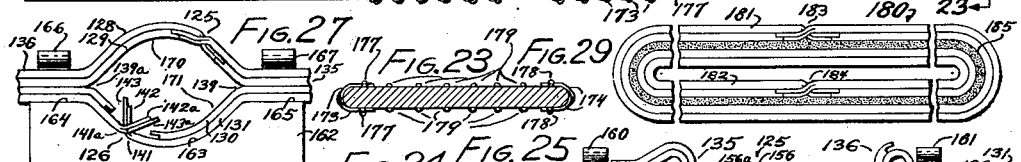
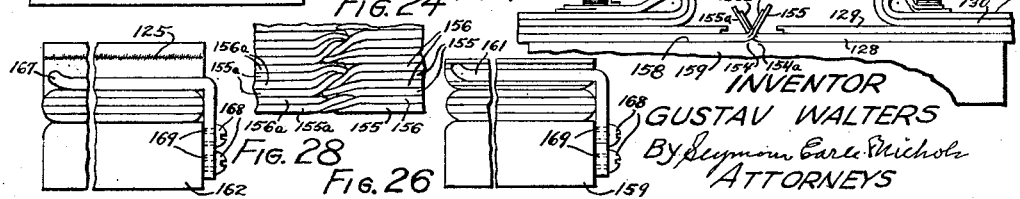
INVENTOR
GUSTAV WALTERS
By Seymour Earle Nichols
ATTORNEYS Patented May 11, 1948

2,441,460

UNITED STATES PATENT OFFICE 2,441,460

BELT SPLICE

Gustav Walters, Middletown, Conn.

Application February 9, 1945, Serial No. 577,116

14 Claims. (Cl. 74—232)

1

This invention relates to improvements in belt-splices and belts employing such splices.

One object of this invention is to provide an improved belt-splice construction in which an endless belt is formed from a tape-like strip by joining the two ends of the strip together in a manner to have a high resistance to deterioration, due to repeated flexing of the splice as it passes over pulleys or the like on which the belt is used.

Another object of this invention is to provide an improved endless belt formed of a tape-like strip having two ends which are spliced together in a manner to have high resistance to damage to the pulley-face of the splice, due to wear, roughing-up action, etc.

Another object of this invention is to provide an improved endless belt formed of a tape-like strip having two ends which are spliced together by means including an improved belt-splice having longitudinal strand-portions at the ends of the strip interwoven together, to provide adequate strength, flexibility approaching that of the other portions of the belt, and weight per unit of length approaching the weight of the other portions of the belt.

Another object of this invention is to provide an improved process of splicing together the ends of a tape-like strip having two ends, to form the foregoing endless belt.

With the above and other objects in view, as will appear to those skilled in the art from the present disclosure, this invention includes all features in the said disclosure which are novel over the prior art.

In the description and claims, the various parts and steps are identified by specific terms for convenience, but they are intended to be as generic in their application as the prior art will permit.

In the accompanying drawings forming part of the present disclosure, in which certain ways of carrying out the invention are shown for illustrative purposes:

Fig. 1 is a perspective view of two pulleys with a single-ply endless belt thereon, which belt is made in accordance with the present invention;

Figs. 2 and 3 are schematic enlarged top plan views of the respective two end-portions of the tape-like strip, prior to their being spliced together to form the endless belt shown in Fig. 1;

Fig. 4 is a schematic enlarged longitudinal vertical sectional view on the line 4—4 of Fig. 1;

Fig. 5 is a top plan view of Fig. 4;

Fig. 6 is a schematic longitudinal vertical sec-

2 tional view similar to Fig. 4, of a modified form of belt-splice;

Fig. 7 is a top plan view similar to Fig. 5, of another modified form of belt-splice;

Fig. 8 is a top plan view similar to Fig. 7, of another modified form of belt-splice;

Fig. 9 is a schematic longitudinal vertical sectional view on the line 9—9 of Fig. 8;

Fig. 10 is a schematic longitudinal vertical sectional view similar to Fig. 4, of another modified form of belt-splice;

Fig. 11 is a schematic longitudinal vertical sectional view similar to Fig. 10, of another modified form of belt-splice;

Fig. 12 is an edge elevation of a modified form of belt and belt-splice;

Fig. 13 is a sectional view on line 13—13 of Fig. 12;

Fig. 14 is a schematic longitudinal vertical sectional view similar to Fig. 4, of a modified construction in which a strip or length of belting made mainly of two plies of woven fabric, has its ends spliced together in accordance with the present invention;

Fig. 15 is a schematic longitudinal vertical sectional view similar to Fig. 14, of another modified form of two-ply-belt splice-construction;

Fig. 16 is a schematic longitudinal vertical sectional view similar to Fig. 14, of another modified form of two-ply-belt splice-construction;

Fig. 17 is a top plan view of the right end-portion of Fig. 16;

Fig. 18 is a schematic longitudinal vertical sectional view similar to Fig. 14, of a modified construction in which a strip or length of belting made mainly of three plies of woven fabric, has its ends spliced together in accordance with the present invention;

Fig. 19 is a schematic longitudinal vertical sectional view similar to Fig. 18, of another modified form of three-ply-belt splice-construction;

Fig. 20 is a schematic longitudinal vertical sectional view similar to Fig. 19, but in opened-up form, of a splice-construction in accordance with the present invention, in a four-ply woven belt;

Fig. 21 is a fragmental edge view, looking in the same direction as Fig. 20, of the finished spliced portion of the four-ply belt-splice schematically illustrated in section in Fig. 20;

Fig. 22 is a top plan view of Fig. 21;

Fig. 23 is a transverse sectional view on line 23—23 of Fig. 22;

Fig. 24 is a top plan view of the near or front edge, fragmental portion of the interwoven splice-joint construction of the bottom ply looking in the direction of the arrow 24 of Fig. 20;

Fig. 25 is a front elevation illustrating a method and apparatus which may be employed in making the lower left interwoven splice-joint shown in Figs. 20 and 24 with the parts of the belt in schematic edge elevation;

Fig. 26 is a right end view of Fig. 25;

Fig. 27 is a front elevation illustrating a method and apparatus which may be employed in making the upper right interwoven splice-joint shown in Fig. 20, with the parts of the belt in schematic edge elevation;

Fig. 28 is a right end view of Fig. 27; and

Fig. 29 is a schematic edge elevation of another modified belt-construction.

Referring to Figs. 1 to 5 inclusive of the drawings showing the particular form of the invention illustrated therein, the single-ply endless belt 30 is formed of a tape-like strip or strip of belting 31 which extends around the pulleys 32 and 33 and has its two end-portions 34 and 35 spliced together to form the interwoven splice or joint 36.

The tape-like strip 31 is formed by means of longitudinal or warp-strands 37 (Fig. 4) interwoven with transverse or weft or filling-strands or picks 38. Preliminary to making the interwoven splice-joint 36, enough of the transverse strands or picks 38 are removed from the end-portions 34 and 35 to leave ample lengths of longitudinal strand-portions or strand-ends 39 and 40 respectively on the end-portions 34 and 35. The longitudinal strand-portions 39 and 40 are schematically shown with alternate strand-portions of different lengths for clearness of illustration in Figs. 2 and 3.

In making the interwoven splice or splice-joint 36, most clearly shown in Figs. 4 and 5, the free longitudinal strand-portions 39 of the strip end-portion 34 can be bent back upon the top of the woven portion of the end 34 of which they are part, and similarly, the longitudinal strand-portions 40 can be bent back upon the woven portion of the end 35. Then, with the woven portions of the ends 34 and 35 having been brought into end-to-end abutting relation (see Fig. 4) at what may be called the interwoven cross-over location 41, one strand-portion 39 can be swung over to the right to lie upon the top of the woven part of the end-portion 35, then a strand-portion 40 can be swung over to the left past the just-mentioned strand-portion 39 until the strand-portion 40 lies upon the woven portion of the end 34, and similarly, the remaining longitudinal strand-portions 39 and 40 can alternately be interwoven past one another until finally all of them have been arranged as illustrated in Figs. 4 and 5 with the past-extending strand-end portions displaced or offset thicknesswise of the strip, from their respective longitudinal strands in such strip-ends preceding said cross-over location. It will be appreciated that most of the figures of the drawings of this application are schematic views, and that, therefore, the showings of many parts are conventionalized and out of proportion in order to obtain clear and easily understood drawings. This is especially so as concerns the showing of the thickness and the uniformity of arrangement of the interwoven longitudinal strand-portions. In order to secure the longitudinal strand-portions 39 and 40 down onto the outer or top face 44 of the belt 30, the strand-portions 39 and 40 can respectively be fastened down with stitches 42 and 43, or they can be cemented down by vulcanizable or other rubber cement or other suitable cementitious material, or both, or they can be fastened down in any other suitable desired way. It will be observed from Figs. 1 and 4 that the strand-portions 39 and 40 in the finished splice, lie on the top or outer face 44 of the belt, away from and out of possible contact with the pulleys 32 and 33, and that the inner or pulley face 45 of the belt is entirely free of any projection, so that this portion of the belt at the spliced-joint passes freely over and in contact with the faces of the pulleys 32 and 33 substantially the same as the rest of the belt. When it is found more convenient for easy manipulation of the longitudinal strand-portions 39 and 40 in carrying out the interweaving operation, they can be made longer than needed in the finished splice, and then can be trimmed off just before or after they are fastened down.

The modified form of interwoven splice 46 of the single-ply belt 47 shown in Fig. 6 is similar to the splice 36 of the belt 30 shown in Figs. 1 to 5, but has the ends 48 and 49 of the respective longitudinal strand-portions 39 and 40 anchored by being drawn down through the woven body of the belt 47 and cut off at the lower face of the belt so as to anchor these ends in the belt. If desired, cement can also be applied to the lower portions of the ends 48 and 49 to cement them to the belt. If desired, the main or horizontal portions 50 and 51 of the respective strand-portions 39 and 40 on the upper face of the belt can also be cemented and/or stitched or otherwise secured to the upper face of the belt.

The modified form of interwoven splice 52 of the single-ply belt 53 shown in Fig. 7 is similar to the splice 36 of the belt 30 of Figs. 1 to 5, but has the longitudinal strand-portions 39 and 40 interwoven in groups of two strands instead of as single strands, and also has the ends of the strand-portions 39 and 40 trimmed to V-shape form 54.

The modified form of interwoven splice 55 of the single-ply belt 56 shown in Figs. 8 and 9 is similar to the splice 52 of the belt 53 of Fig. 7, but has the ends of the longitudinal strand-portions 39 and 40 trimmed along parallel lines 47 extending at an acute angle to the side edges of the belt.

The modified form of interwoven splice 58 of the single-ply belt 59 shown in Fig. 10 is somewhat similar to the splice 36 of the belt 30 of Figs. 1 to 5, but the ends of the woven portions of the ends 34 and 35 are not brought into abutting relation, but are spaced apart as shown, and the interwoven longitudinal strand-portions 39 and 40 are located mainly between the spaced ends of the woven portions of the ends 34 and 35, and are secured together by stitches 60 and/or cement.

The modified form of interwoven splice 61 of the single-ply belt 62 shown in Fig. 11 is similar to the splice 58 of the belt 59 shown in Fig. 10, but has two filler-pieces 63 and 64 inserted between the interwoven strand-portions 39 and 40, the parts 39, 40, 63 and 64 being secured together by stitches 65 and/or cement. The filler-pieces may be of fabric, rubber, rubber-impregnated fabric, or other suitable material.

In the modified form of the invention illustrated in Figs. 12 and 13, a tape-like strip of single-ply belting 66 is first formed by cementing or otherwise securing a plurality of parallel longitudinal strands 67 together side-by-side to form the tape-like strip 66. The end-portion 68 of the tape-like strip 66 has its longitudinal strand-portions 69 separated from one another and interwoven with similarly-separated longitudinal strand-portions 70 of the other end-portion 71 of the strip 66 to form the interwoven splice 72. The interwoven longitudinal strand-portions 69 and 70 can be secured down upon the upper surface of the tape-like strip 66 by means of cement or other desired means. And if desired, the extreme ends of the strand-portions 69 and 70 can be chamfered as illustrated at 73.

The modified form of interwoven splice 74 of the two-ply belt 75 illustrated in Fig. 14, includes the interwoven splice 76 of the ply 77 and the interwoven splice 78 of the ply 79. Each of the splices 76 and 78 of the plies 77 and 79 is generally similar to the splice 36 of the single-ply belt 30 of Figs. 1 to 5. The splices 76 and 78 are displaced or offset longitudinally of the belt from each other with the interwoven longitudinal strand-portions 80 and 81 of the splice 76 and the interwoven longitudinal strand-portions 82 and 83 of the splice 78 lying in the interior of the belt between the plies 77 and 79. By spacing the splices of the two plies longitudinally of the belt from each other instead of having them directly over one another, the resultant endless belt will have more-nearly-uniform flexibility and weight and resistance to repeated flexing throughout its length. A filler-strip 84 having substantially the same effective thickness as the increase in thickness of the portion of the belt in which the strand-portions 80, 81, 82 and 83 are located, extends throughout the length and width of the belt not occupied by the strand-portions 80, 81, 82 and 83, so as to make the belt of substantially-uniform thickness throughout its length. Where the two-ply belt 75 is originally woven as a length of two-ply woven belting, the filler-strip 84 can be conveniently provided by weaving a layer of gutting warps between the two plies 77 and 79 during the weaving operation, in which case, the portions of the filler-strip which initially occupy the space shown in the drawing as occupied by the interwoven strand-portions 80, 81, 82 and 83, would be removed as part of the operation of separating the plies in the region to be spliced, which separating operation can be accomplished by severing the binder or binder warp-strands which interconnect the two plies of a woven two-ply fabric, by means of a sharp knife or the like, as is well understood by those skilled in the art.

Where the two-ply belt 75 is made from two originally separate lengths of single-ply belting or fabric, ordinarily each length of single-ply fabric would have its ends spliced together by an interwoven splice as shown, to thus produce two independent single-ply endless belts, with one of the belts shorter than the other so as to be of proper length to fit properly inside of the other, with the filler-strip 84, of fabric, rubberized fabric, rubber, or other suitable material, between them. The plies and filler-strip can be secured together by vulcanizable rubber or other cement, and/or sewing longitudinally through the two plies and filler strip, throughout the length of the thus-made two-ply endless belt. In this case, the two splices can be longtiudinally spaced apart any desired distance up to half the total length of the completed endless belt without wasting belting material, as would occur if the two splices of a two-ply woven length of belting were spaced far apart. Where the interwoven splices are spaced so far apart that there is a gap between the interwoven strand-portions of one splice and the nearest interwoven strand-portions of the other splice, a length of filler-strip would also be inserted to fill the gap. It is to be noted, however, that the interwoven strand-portions of the splices are shown schematically much thicker than they would ordinarily be, and, in any case, the two-ply belt made from two separate plies of fabric could be made without employing any special filler-strip, the two plies being cemented together by cement, which by pressing the belt to uniform thickness during the completion of the cementing operation in a way well known to those skilled in the art, would cause cement to be squeezed out from the belt areas of greater thickness, to thus vary the thickness of the cement in different areas to thus produce a belt of uniform thickness. Another way in which a multi-ply belt can be made from single-ply fabric or belting, is by folding the single-ply material transversely along a longtiudinal line or lines, and longitudinally sewing and/or cementing the layers of the material together, as is well understood by those skilled in the art.

The modified form of splice 85 of the two-ply belt 86 illustrated in Fig. 15, includes the interwoven splice 87 of the ply 88 and the overlapped splice 89 of the ply 90. The splice 87 of the ply 88 is generally similar to the splice 76 of the ply 77 of Fig. 14, but the overlapped splice 89 of the ply 90 is formed by arranging the longitudinal strand-portions 91 in one plane, and arranging the longitudinal strand-portions 92 in overlapping superposed relation. In addition to the filler-strip 93 which is similar to the filler-strip 84 of Fig. 14, a supplemental filler-strip or block 94 is interposed between the filler-strip 93 and the layer of strand-portions 91 to make this portion of the belt of substantially the same thickness as the rest of the belt. The layers of strand-portions 91 and 92 and filler-block 94 and filler-strip 93 and lower ply 88, and the plies 88 and 90 and filler-strip 93, can be connected together by any suitable means as by cementing and/or sewing as described concerning the construction of Fig. 14.

The modified form of splice 95 of the two-ply belt 96 illustrated in Figs. 16 and 17, is similar to the splice 85 of the belt 86 illustrated in Fig. 15, but the splice 97 of the upper ply 98 of the belt 96, is formed by overlapping portions 99 and 100 cut at an angle along the line or plane of juncture 101. In addition to cementing and/or sewing the parts of the splice 95 of the belt 96 together similarly to the way described concerning Fig. 15, the adjoining edges of the upper ply 98 can be cemented together along their plane of juncture 101.

The form of splice 102 of the three-ply belt 103 illustrated in Fig. 18, has the three plies 104, 105 and 106 respectively provided with interwoven splices 107, 108 and 109, similar to the interwoven splices hereinbefore described. A filler-strip 110 extends throughout the entire length of the endless belt except in the region of the belt splice 102, to make the belt of substantially-uniform thickness throughout its length. The plies and other parts of the belt are connected together by any suitable means, as by cementing and/or sewing as hereinbefore described.

The form of splice 111 of the three-ply belt 112 illustrated in Fig. 19, has the lower and upper outside plies 113 and 114 respectively provided with interwoven splices 115 and 116 similar to the interwoven splices hereinbefore described, but the intermediate ply 117 has longitudinal strand-portions 118 and 119 respectively in overlapping relation with longitudinal strand-portions 120 of the splice 115 and longitudinal strand-portions 121 of the splice 116. Any suitable filler material 122 such, for example, as vulcanizable rubber, with or without added fibres or fabric, can be vulcanized in place to make the splice region of the belt of substantially the same thickness as the rest of the belt. The plies and other parts of the belt can be connected together by any suitable means, as by cementing and/or sewing as hereinbefore described.

In order that it will be clear how any belt, whether of four plies, or of a greater or lesser number of plies than four, can be spliced in accordance with the present invention, one mode of procedure or method of splicing the four-ply belt 123 illustrated in Figs. 20 to 28, will now be described. The complete splicing operation involves many steps, and in describing the procedure, for brevity, only one order of carrying out these steps will be described, but it is not intended to indicate any particular order as essential, as it will be obvious that many of the steps can be carried out in any of a number of different orders.

The splice-construction of the four-ply belt schematically illustrated in Figs. 20 to 28, for clearness is shown in Fig. 20 in a much more opened-up schematic form than was employed in illustrating the forms of the invention illustrated in the previous figures.

The four-ply belt 123 which is provided with the splice 124 which includes the two interwoven splices 125 and 126, as illustrated in Figs. 20 to 28 inclusive, is formed from a length of woven four-ply belting 127, which as originally woven included plies 128, 129, 130 and 131 connected together by binder warp-strands 132. Each of the four woven plies is formed of interwoven warp-strands 133 and weft-strands or picks 134.

Notwithstanding the many operations involved in splicing the belt 123 illustrated in Figs. 20 to 28, a skilled worker accomplishes the splicing with considerable speed, but in doing so, he frequently performs the various steps in an order which would be very difficult if not impossible for the reader to follow, and as no particular order of steps is essential, the steps will be described in the easiest-to-follow order. Also, the skilled worker will ordinarily carry out his operations so as to provide excess lengths of longitudinal-strand portions which are to be interwoven, and then at a later stage of the splicing process will trim off the excess lengths of such strands. But again, for clearness and to avoid confusion, the steps of the operations will be described as though the various strand-portions were originally provided as illustrated in Figs. 20 to 28 of the drawings.

Prior to splicing the left end-portion 135 and the right end-portion 136 of the tape-like strip or length of four-ply belting 127 together, the ends of all four plies of the end-portion 135 will ordinarily all extend along to the same point or location (not shown) as would be made by a transverse cut square across the ends of the four plies of the end-portion 135, and similarly for the other end-portion 136.

With a sharp knife or other suitable implement, the binder-strands 132 interconnecting the two upper plies 130 and 131, are severed beginning from the extreme right end 137 of the left end-portion 135 of the strip of belting 127, back to a location 138, the binder-strands 132 interconnecting the two intermediate plies 129 and 130, are similarly severed back to a location 139; and the binder strands 132 interconnecting the two lower plies 128 and 129, are similarly severed back to a location 140.

The weft picks 134 are ravelled or pulled out of the top ply 131 of the left end-portion 135 from the end 137 back to a location 141 to leave layers or harnesses of free longitudinal warp strand-portions 142 and 143. The layer of strand-portions 142 is cut back to a location 144. The next-to-top ply 130 of the left end-portion 135 is cut off back to a location 145 and the weft picks 134 are removed from the ply 130 from the end or location 145 back to a location 146 to leave a layer or harness of free longitudinal warp strand-portions 147, and leave a similar layer or harness of longitudinal warp strand-portions (not shown) above the layer of strand-portions 147 and which have been cut away back to 148 at the location 146.

The next-to-bottom ply 129 of the left end-portion 135 is cut off back to a location 149 and the weft-picks 134 are removed from the ply 129 from the end or location 149 back to a location 150 to leave a layer or harness of free longitudinal warp strand-portions 151, and leave a similar layer or harness of longitudinal warp strand-portions (not shown) below the layer of strand-portions 151 and which have been cut away back to 152 at the location 150.

The bottom ply 128 of the left end-portion 135 is cut off back to a location 153 and the weft-picks 134 are removed from the ply 128 from the end or location 153 back to a location 154 to leave layers or harnesses of free longitudinal warp strand-portions 155 and 156. The layer of strand-portions 156 are cut back to a location 157.

Operations corresponding to those hereinbefore described for the left end-portion 135 of the length of belting 127, are performed on the right end-portion 136 of the belting, so as to provide corresponding parts, including the parts numbered 137a, 139a, 141a, 142a, 143a, 147a, 151a, 154a, 155a and 156a, respectively corresponding to the similar parts of the left end-portion 135 numbered 137, 139, 141, 142, 143, 147, 151, 154, 155 and 156.

The left and right end-portions 135 and 136 as thus prepared for making the splice 124 of the belt 123 illustrated in Fig. 20, can conveniently be placed in end-to-end relation on the flat top surface 158 of a table or block 159 (Figs. 25 to 26), with the two top plies 130 and 131 of the left end-portion 135 bent back out of the way and held by any suitable means, such for example, as by being frictionally held by a spring clamp 160, and with the two top plies 130 and 131 of the right end-portion 136 bent back out of the way and frictionally held by a similar spring clamp 161, with the locations 154 and 154a of the bottom ply 128 in as close together relation as is feasible, and with the free longitudinal strand-portions 155 and 156 bent back to the left (not so shown) above the ply 128 and with the free longitudinal strand-portions 155a and 156a bent back to the right (not so shown) above the ply 128. The described bent-back positions of the free longitudinal strand-portions are merely preliminary positions of convenience.

Next, the nearest two of the longitudinal strand-portions 155 and 156 are swung as a group (Figs. 24 and 25) from their left-bent-back position over to the right beyond their position shown in Fig. 25. Then the nearest two of the longitudinal strand-portions 155a and 156a are swung as a group from their right-bent-back position over to the left beyond their position shown in Fig. 25. Then the next four (Fig. 24) longitudinal strand-portions 155 and 156 are swung as a group from their left-bent-back position over to the right, and the corresponding next four longitudinal strand-portions 155a and 156a are swung as a group from their right-bent-back position over to the left, and so on with each group of four strand-portions 155 and 156, and then with each group of four strand-portions 155a and 156a until all the free longitudinal strand-portions 155, 156, 155a and 156a are thus interwoven, until the location near the far edge (not shown) of the ply 128 is reached where there are less than four strands 155, 156 left and less than four strands 155a, 156a left, when these lesser numbers of strands are interwoven as groups, each of which groups may contain two or three strands. If for any reason more strands are found in one last group than in the complemental last group, such excess strand or strands can be added to the preceding one or two corresponding groups of four.

I have found that by having a majority of the free longitudinal strand-portions interwoven as groups of strands rather than as single strands, the resulting interwoven splice has a greater length of life. It is advantageous to have most of the longitudinal strand-portions in groups of at least three strands, but any number of strands up to even eight or more can be employed in a group. But when too large a number of strands are in a group, the interwoven splice has a rather less attractive appearance. I have found that having six strands in a group produces a satisfactory-appearing interwoven splice of very long life. The interwoven strands at the opposite edges of the interwoven splice of a ply are preferably interwoven as single strands or as groups of not more than two or three strands each, in order to produce reasonably smooth appearing opposite edges of the interwoven splice.

If the thus interwoven longitudinal strand-portions 155, 156, 155a and 156a are of excess length, as the operator will usually leave them until after they have been interwoven, they are cut to proper lengths and cemented down, preferably with vulcanizable rubber cement, to produce the interwoven splice or joint 125, schematically shown at the top of Fig. 27 but actually completed while in position on the table or block 159 shown in Fig. 25.

To make the interwoven splice or joint 126 of the top-ply 131 shown in Fig. 20, a block 162 (Figs. 27 and 28) may be provided with a central curved depressed surface 163 and two spaced-apart flat surfaces 164 and 165. Any suitable holding-means such, for example, as the spring-arm clamps 166 and 167 may be provided for frictionally holding the partly-spliced belt in position for making the interwoven splices 126. In shifting the belt from its position on block 159 (Fig. 25) to block 162 (Fig. 27), the belt-portion including the end-portions 135 and 136 and the interwoven splice 125 cemented and preferably at least partly dried, could either be rotated about an axis parallel to the length of the belt-portion or about an axis at right angles to the plane of Fig. 27, and then pushed frictionally under the clamps 166 and 167. It will be seen from the positions of the interwoven splices 125 and 126 that the latter direction of rotation has been employed. Thus, the completed interwoven splice 125 is located up out of the way, and the woven end-locations 141 and 141a of the ply 131 are brought into as close as feasible abutting relation in supported position on the curved surface 163 of the block 162, preliminary to interweaving and cementing down the longitudinal strand-portions 142, 143, 142a and 143a to form the interwoven splice 126, in a similar way to that described concerning the interwoven splice 125.

The spring-arm clamps 160, 161, 166 and 167 can be attached to their respective supporting-blocks 159 and 162 in any suitable way, as for example by screws 168 extending through vertical slots 169 of any desired length to provide for vertical adjustment of the clamps.

After the cement on the interwoven splices 125 and 126 has dried sufficiently to permit of free handling, the opposed faces 170 and 171 (Fig. 27) of the plies 129 and 130 including the interwoven strand areas are coated preferably with vulcanizable rubber cement between the locations 139 and 139a, and the faces 170 and 171 are pressed together in cemented-together relation at the line or plane 172 (Fig. 21).

If the splice 124 of the belt 123 is to be reinforced by sewing, rows of edge-stitches 173 and 174 (Figs. 21, 22 and 23) are sewed over the opposite side-edges 175 and 176 of the belt, approximately for the length of the cemented-together faces 170 and 171 indicated by the line 172 in Fig. 21. Rows of stitches 177 and 178 are respectively sewed through the belt and over the tops of the edge-stitches 173 and 174, and intermediate rows of stitches 179 are similarly sewed through the belt.

Next, the belt-splice 123 is properly heated to vulcanize all the rubber cement in the splice. Next, the whole belt is treated or impregnated with a vulcanizable rubber solution or dispersion in solvent, and after drying the solvent out sufficiently, the entire belt is properly heated to vulcanize it in a way well known to those skilled in the art. It is not necessary to vulcanize the belt-splice before impregnating and vulcanizing the whole belt, if sufficient care is taken to prevent the impregnating rubber solution from loosening the previously-cemented parts, thus permitting of performing all the vulcanizing in a single vulcanizing operation.

Except for the exaggerated thickness of the stitches in Figs. 21, 22 and 23, these figures illustrate the belt of Figs. 20 to 28 in approximately actual proportion. For clearness of illustration, the plies and longitudinal-strand portions of the belt are shown in Figs. 25 and 27 as much thicker than they actually are in proportion to the lengths of the parts shown in these figures, and similar exaggerated thickness of parts is also true of the construction of Fig. 29 to be later described.

In the particular four-ply belt illustrated in Figs. 20 to 28, the various parts were made of the following approximate dimensions, although it will be understood that these dimensions may be widely varied. Width of belt, one and three-quarter inches; thickness of belt, three sixteenths of an inch; length of longitudinal strand-portions 143, one inch; length of strand-portions 147, one-quarter to three eighths of an inch; distance between locations 139 and 139a, ten inches.

The modified construction of belt 180 illustrated in schematic edge view in Fig. 29 is made up of two two-ply woven belts 181 and 182, respectively having their originally free belting-ends spliced together by interwoven splices 183 and 184 similar to the interwoven splices shown in Figs. 20 to 28. After the two two-ply belts 181 and 182 have been thus spliced to form two endless belts, with the belt 182 of suitably less length than the belt 181, the inside of belt 181 and the outside of belt 182 are coated with vulcanizable rubber cement, and after suitable drying of the same, the belt 182 is placed inside of the belt 181 with a layer 185 of vulcanizable rubber between them, and after pressing the parts together to form the belt 180, the same can be impregnated with vulcanizable rubber solution, and after drying, the belt 180 can be vulcanized, as is well understood in the art. The layer 185 may be of soft vulcanized rubber or sponge rubber, or of other suitable flexible or elastic material such as a resin, such for example as a plasticized vinyl resin, and the layer 185 may have any desired thickness from one thirty-second of an inch up to one-quarter of an inch or more, depending upon the use to which the belt is to be put. Thus, where the belt is to be used to pass between a pair of fixed rolls and carry materials therebetween, the layer 185 would be fairly thick, and might be of sponge rubber to more readily permit of hard particles carried on the belt between the rolls to be pressed into the surface of the belt temporarily without injury to the belt. But where the belt is to be used merely to transmit power between two pulleys, there ordinarily need be no thickness to the layer 185, and in this case the two two-ply belts could be cemented together in contact with one another. The interwoven splices 183 and 184 both face toward the center of the belt 180, similar to the splices 125 and 126 of the belt 123 of Figs. 20 to 28, but the splices 183 and 184 are preferably spaced apart the maximum distance from each other, so that the length of belt between them is the same in both directions.

As is well known to those skilled in the art, most strands used in the manufacture of textile belting are cabled strands. A cabled strand is formed of two or more yarns or smaller strands twisted together. When, for example, two yarns are twisted together to form a strand, the diameter, that is the maximum diameter, of the strand at any point along its length is equal to the sum of the diameters of the two yarns forming the strand, so that the diameter (maximum diameter) of the strand may be said to be constant along the length of the strand, although the rotational position of this maximum diameter shifts along the strand formed by the helically twisted yarns. From the foregoing, the meaning of expressions such as "substantially constant-diametered strand-end portions," and the like, will be evident.

Expressions such as "strips secured together in superposed relation" are intended to mean that the strips are located one over another, thicknesswise of the strips, and secured together, regardless of whether or not any two of the strips are in direct contact with one another.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:
1. An endless belt including: a tape-like strip of at least one ply, and having two strip-ends; said strip having a plurality of longitudinal strands which extend substantially throughout the length of the strip, and which longitudinal strands are laterally secured together; said strip-ends being spliced together by splice-means including substantially constant-diametered strand-end portions of said longitudinal strands of each said strip-end extending between and past said strand-end portions of the other strip-end, along a cross-over location extending widthwise of the strip; and at least part of the length of said past-extending strand-end portions of said strip-ends being offset in the same general direction thicknesswise of the strip from their respective longitudinal strands in said strip-ends preceding said cross-over location.

2. An endless belt including: a tape-like strip of at least one ply, and having two strip-ends; said strip having a plurality of longitudinal strands which extend substantially throughout the length of the strip, and which longitudinal strands are laterally secured together; said strip-ends being spliced together by splice-means including groups of strand-end portions of said longitudinal strands of each said strip-end extending between and past groups of strand-end portions of the other strip-end, along a cross-over location extending widthwise of the strip, each said group consisting of a plurality of said strand-end portions; and at least part of the length of said past-extending strand-end portions of said strip-ends being offset in the same general direction thicknesswise of the strip from their respective longitudinal strands in said strip-ends preceding said cross-over location.

3. An endless belt including: a tape-like strip of at least one ply, and having two strip-ends; said strip having a plurality of longitudinal strands which extend substantially throughout the length of the strip and each of which longitudinal strands is of substantially constant diameter substantially throughout its length, and which longitudinal strands are laterally secured together; said strip-ends being spliced together by splice-means including substantially constant-diametered strand-end portions of said longitudinal strands of each said strip-end extending between and past said strand-end portions of the other strip-end, along a cross-over location extending widthwise of the strip; and at least part of the length of said past-extending strand-end portions of said strip-ends being offset in the same general direction thicknesswise of the strip from their respective longitudinal strands in said strip-ends preceding said cross-over location, and being secured against the strip along securing-regions at opposite sides of said cross-over location.

4. An endless belt including: a tape-like strip of at least one ply, and having two strip-ends; said strip having a plurality of longitudinal strands which extend substantially throughout the length of the strip, and which longitudinal strands are woven with a plurality of transverse strands; said strip-ends being spliced together by splice-means including substantially constant-diametered strand-end portions of said longitudinal strands of each said strip-end extending between and past said strand-end portions of the other strip-end, along a cross-over location extending widthwise of the strip; and at least part of the length of said past-extending strand-end portions of said strip-ends being offset in the same general direction thicknesswise of the strip from their respective longitudinal strands in said strip-ends preceding said cross-over location, and being secured against the strip along securing-regions at opposite sides of said cross-over location.

5. An endless belt including: a tape-like strip of at least one ply, and having two strip-ends; said strip having a plurality of longitudinal strands which extend substantially throughout the length of the strip, and which longitudinal strands are woven with a plurality of transverse strands; said strip-ends being spliced together by splice-means including strand-end portions of said longitudinal strands of each said strip-end having the transverse strands removed therefrom, and said strand-end portions of each said strip-end extending between and past strand-end portions of the other strip-end, along a cross-over location extending widthwise of the strip; and at least part of the length of said past-extending strand-end portions of said strip-ends being offset in the same general direction thicknesswise of the strip from their respective longitudinal strands in said strip-ends preceding said cross-over location, and being secured against the strip along securing-regions at opposite sides of said cross-over location.

6. An endless belt including: a plurality of tape-like strips secured together in superposed relation; one of said strips being one outside strip, and another of said strips being the other outside strip of the belt; one outside strip having two strip-ends, and each of said strip-ends having longitudinal strand-portions; said one outside strip having its said strip-ends spliced together by splice-means including longitudinal strand-portions of each of its strip-ends extending between and past longitudinal strand-portions of its other strip-end, along a cross-over location extending widthwise of the strip; and at least part of the length of said past-extending strand-portions of said strip-ends of said one outside strip being offset thicknesswise of such strip from the strip-end portions preceding said cross-over location, toward the other outside strip, and said past-extending strand-portions being located in the belt between the opposite outside faces of the belt.

7. An endless belt including; a plurality of tape-like strips secured together in superposed relation; one of said strips being one outside strip, and another of said strips being the other outside strip of the belt; one outside strip having two strip-ends and having a plurality of longitudinal strands which extend substantially throughout the length of the strip and which are laterally secured together; said one outside strip having its said strip-ends spliced together by splice-means including strand-end portions of said longitudinal strands of each of its strip-ends extending between and past strand-end portions of its other strip-end, along a cross-over location extending widthwise of the strip; and at least part of the length of said past-extending strand-end portions of said strip-ends of said one outside strip being offset thicknesswise of such strip from their respective longitudinal strands in said strip-ends preceding said cross-over location, toward the other outside strip, and said past-extending strand-end portions being located in the belt between the opposite outside faces of the belt.

8. An endless belt including: a plurality of tape-like strips secured together in superposed relation; one of said strips being one outside strip, and another of said strips being the other outside strip of the belt; each outside strip having two strip-ends, and each strip-end of each outside strip having longitudinal strand-portions; each outside strip having its said strip-ends spliced together by splice-means including longitudinal strand-portions of each of its strip-ends extending between and past longitudinal strand-portions of its other strip-end, along a cross-over location extending widthwise of the strip; and at least part of the length of said past-extending strand-portions of each outside strip being offset thicknesswise of such strip from the strip-end portions preceding said cross-over location, toward the other outside strip, and said past-extending strand-portions being located in the belt between the opposite outside faces of the belt.

9. An endless belt including: a plurality of tape-like strips secured together in superposed relation; one of said strips being one outside strip, and another of said strips being the other outside strip of the belt; each outside strip having two strip-ends, and having a plurality of longitudinal strands which extend substantially throughout the length of such strip, and which are laterally secured together; each outside strip having its said strip-ends spliced together by splice-means including strand-end portions of said longitudinal strands of each of its strip-ends extending between and past strand-end portions of its other strip-end, along a cross-over location extending widthwise of the strip; and at least part of the length of said past-extending strand-end portions of each outside strip being offset thicknesswise of such strip from their respective longitudinal strands in said strip-ends preceding said cross-over location, toward the other outside strip, and said past-extending strand-end portions being located in the belt between the opposite outside faces of the belt.

10. An endless belt including: a plurality of tape-like strips secured together in superposed relation; one of said strips being one outside strip, and another of said strips being the other outside strip of the belt; each outside strip having two strip-ends, and having a plurality of longitudinal strands which extend substantially throughout the length of such strip, and which are laterally secured together; each outside strip having its said strip-ends spliced together by splice-means including strand-end portions of said longitudinal strands of each of its strip-ends extending between and past strand-end portions of its other strip-end, along a cross-over location extending widthwise of the strip; at least part of the length of said past-extending strand-end portions of each outside strip being offset thicknesswise of such strip from their respective longitudinal strands in said strip-ends preceding said cross-over location, toward the other outside strip, and said past-extending strand-end portions being located in the belt between the opposite outside faces of the belt; and the cross-over location of the strand-end portions of one said outside strip being displaced a substantial distance longitudinally of the belt from the cross-over location of the strand-end portions of the other said outside strip.

11. An endless belt including: a plurality of tape-like strips secured together in superposed relation; one of said strips being one outside strip, and another of said strips being the other outside strip of the belt; each outside strip having two strip-ends, and having a plurality of longitudinal strands which extend substantially throughout the length of such strip, and which longitudinal strands are woven with a plurality of transverse strands; each outside strip having its said strip-ends spliced together by splice-means including strand-end portions of said longitudinal strands of each of its strip-ends extending between and past strand-end portions of its other strip-end, along a cross-over location extending widthwise of the strip; and at least part of the length of said past-extending strand-end portions of each outside strip being offset thicknesswise of such strip from their respective longitudinal strands in said strip-ends preceding said cross-over location, toward the other outside strip, and said past-extending strand-end portions being located in the belt between the opposite outside faces of the belt.

12. An endless belt including: a plurality of tape-like strips secured together in superposed relation; one of said strips being one outside strip, and another of said strips being the other outside strip of the belt; each outside strip having two strip-ends, and having a plurality of longitudinal strands which extend substantially throughout the length of such strip, and which longitudinal strands are woven with a plurality of transverse strands; each outside strip having its said strip-ends spliced together by splice-means including strand-end portions of said longitudinal strands of each of its strip-ends having the transverse strands removed therefrom, and said strand-end portions of each said strip-end extending between and past strand-end portions of its other strip-end, along a cross-over location extending widthwise of the strip; and at least part of the length of said past-extending strand-end portions of each outside strip being offset thicknesswise of such strip from their respective longitudinal strands in said strip-ends preceding said cross-over location, toward the other outside strip, and said past-extending strand-end portions being located in the belt between the opposite outside faces of the belt.

13. An endless belt including: at least three tape-like strips secured together in superposed relation; each outside strip, and each strip next inward adjacent an outside strip, having two strip-ends and having a plurality of longitudinal strands which extend substantially throughout the length of the strip containing them, and which longitudinal strands are woven with a plurality of transverse strands; each outside strip having its strip-ends spliced together by splice-means including strand-end portions of its longitudinal strands of each of its strip-ends having the transverse strands removed therefrom, and said strand-end portions of each of its strip-ends extending between and past strand-end portions of its other strip-end, along a cross-over location extending widthwise of such strip; each strip next inward adjacent an outside strip having each of its strip-ends stop a substantial distance short of the cross-over location of the next adjacent outside strip; and at least part of the length of said past-extending strand-end portions of each outside strip being offset thicknesswise of such strip from their respective longitudinal strands in said strip-ends preceding said cross-over location, toward the other outside strip, and said past-extending strand-end portions being located in the belt between the opposite outside faces of the belt.

14. An endless belt including: at least four tape-like strips secured together in superposed relation; each outside strip, and each strip next inward adjacent an outside strip, having two strip-ends and having a plurality of longitudinal strands which extend substantially throughout the length of the strip containing them, and which longitudinal strands are woven with a plurality of transverse strands; each outside strip having its strip-ends spliced together by splice-means including strand-end portions of its longitudinal strands of each of its strip-ends having the transverse strands removed therefrom, and said strand-end portions of each of its strip-ends extending between and past strand-end portions of its other strip-end, along a cross-over location extending widthwise of such strip; each strip next inward adjacent an outside strip having each of its strip-ends stop a substantial distance short of the cross-over location of the next adjacent outside strip; at least part of the length of said past-extending strand-end portions of each outside strip being offset thicknesswise of such strip from their respective longitudinal strands in said strip-ends preceding said cross-over location, toward the other outside strip, and said past-extending strand-end portions being located in the belt between the opposite outside faces of the belt; and the cross-over location of the strand-end portions of one said outside strip being displaced a substantial distance longitudinally of the belt from the cross-over location of the strand-end portions of the other said outside strip.

GUSTAV WALTERS.

REFERENCES CITED

The following references are of record in the file of this patent:

UNITED STATES PATENTS

| Number | Name | Date |
|---|---|---|
| 382,305 | Herr | May 8, 1888 |
| 726,670 | Geisel | Apr. 28, 1903 |
| 1,219,151 | Reed | Mar. 13, 1917 |
| 1,474,774 | Fuller | Nov. 20, 1923 |
| 1,735,686 | Kimmich | Nov. 12, 1929 |
| 2,343,184 | Hieber et al. | Feb. 28, 1944 |

FOREIGN PATENTS

| Number | Country | Date |
|---|---|---|
| 76,597 | Switzerland | May 16, 1918 |
| 80,779 | Sweden | June 26, 1934 |